Figure 4:
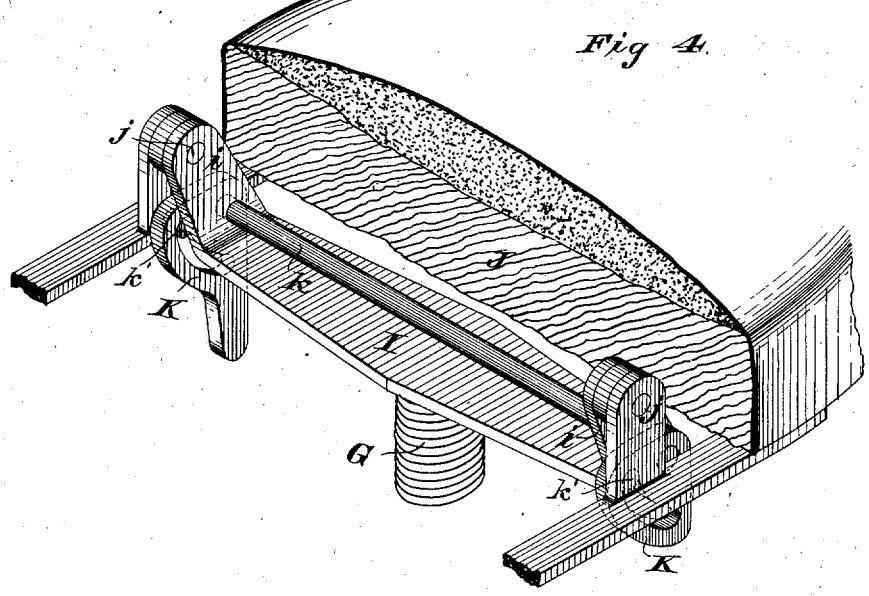

J. O. WHITCOMB.
Assignor to S. S. WHITE.
Dental Operating Chair.
No. 8,389. Reissued Aug. 27, 1878.
*Fig 2* *Fig 1.*
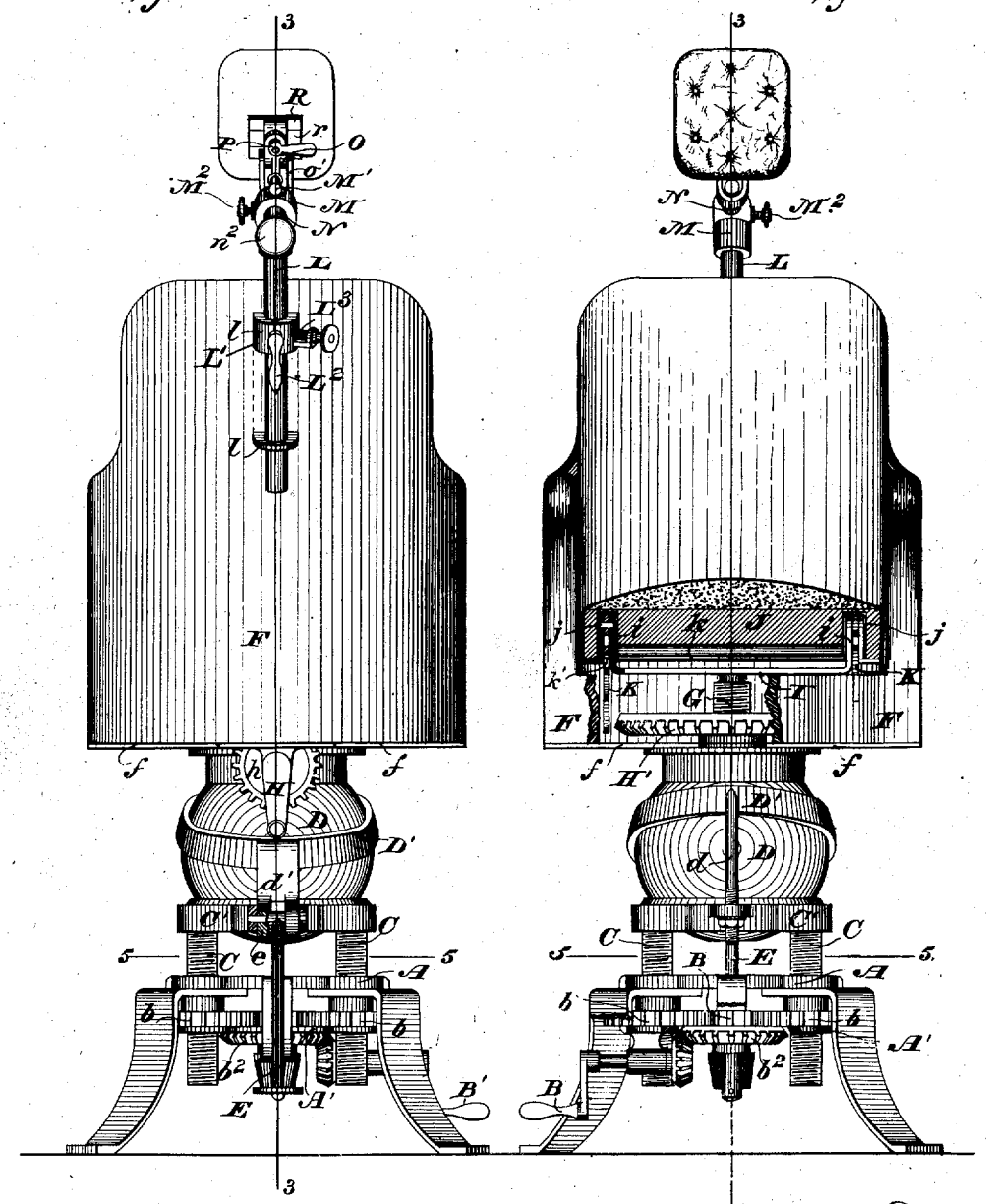
WITNESSES
Wm. A. Skinkle
Geo W Breck
Samuel S. White, assee of James O. Whitcomb, Inventor.
By his Attorneys
Baldwin Hopkins & Peyton

J. O. WHITCOMB.
Assignor to S. S. WHITE.
Dental Operating Chair.
No. 8,389. Reissued Aug. 27, 1878.
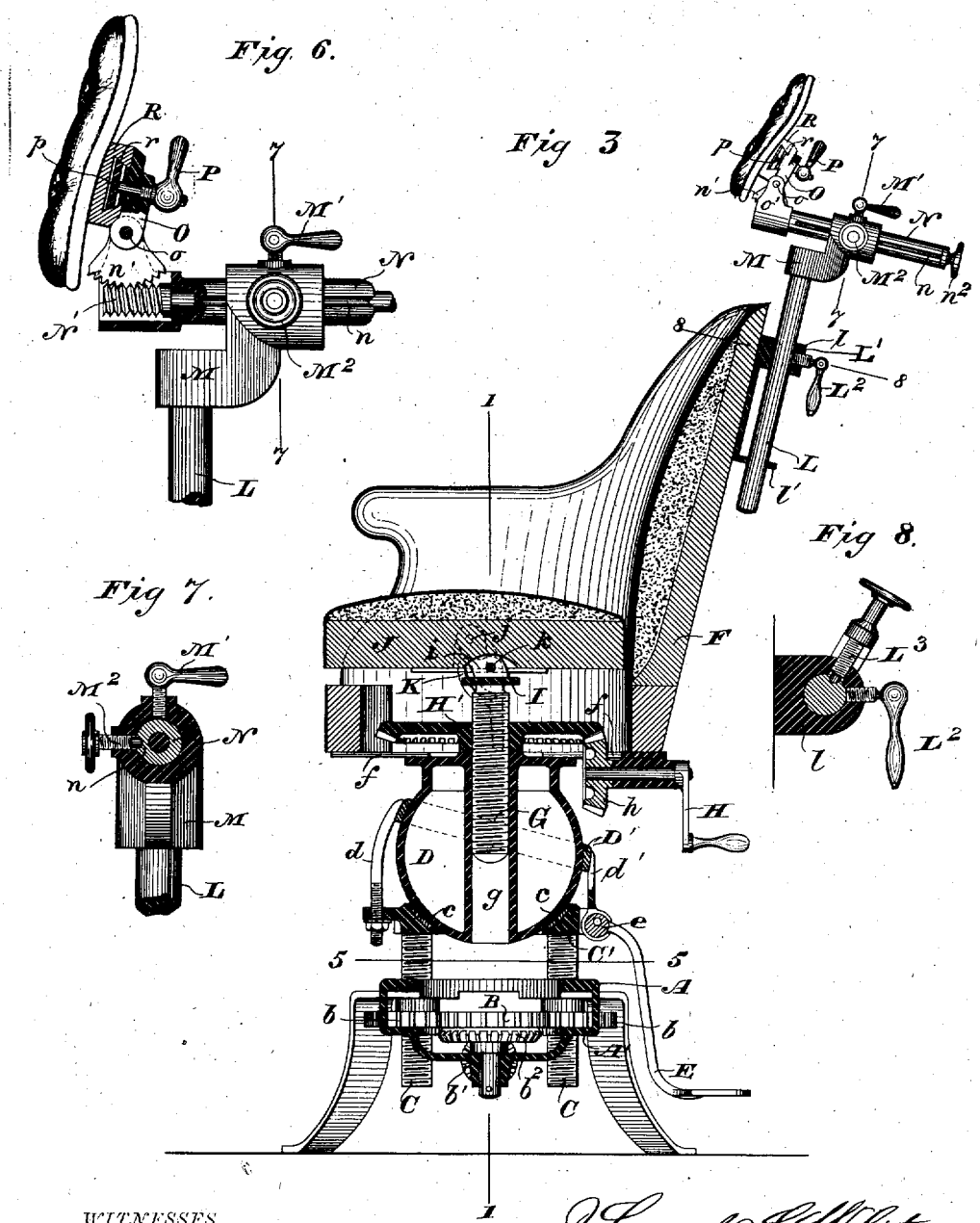
WITNESSES
Wm A Skinkle
Geo W. Breck
Samuel S. White, assee of James. O. Whitcomb. Inventor.
By his Attorneys,
Baldwin Hopkins & Peyton

J. O. WHITCOMB.

Assignor to S. S. WHITE.

Dental Operating Chair.

No. 8,389. Reissued Aug. 27, 1878.

WITNESSES:

Wm. A. Stinkly

Geo. W. Beck

Samuel S. White, assee of James O. Whitcomb. Inventor,

By his Attorneys,

Baldwin, Hopkins & Peyton

UNITED STATES PATENT OFFICE.

SAMUEL S. WHITE, OF PHILADELPHIA, PENNSYLVANIA, ASSIGNEE OF JAMES O. WHITCOMB.

IMPROVEMENT IN DENTAL OPERATING-CHAIRS.

Specification forming part of Letters Patent No. 50,291, dated October 3, 1865; Reissue No. 8,389, dated August 27, 1878; application filed March 28, 1878.

*To all whom it may concern:*

Be it known that JAMES O. WHITCOMB, of the city, county, and State of New York, did invent certain new and useful Improvements in Dental Operating-Chairs, of which the following is a specification:

The first branch of the invention relates more especially to dentists' chairs of that class having a fixed or non-rotating base with a chair-body capable of adjustment vertically, horizontally, and as to inclination relatively to the base.

The object of this part of the invention is, while giving the chair-body a wide range of adjustment, to support it firmly upon the base, which ends are attained by mounting the chair-body upon a rocking support controlled in its vertical movements by a series of screws mounted in the base and simultaneously actuated to raise or lower the chair-body by a corresponding series of nut-wheels also mounted in the base.

The next branch of the invention relates more especially to that class of chairs in which the vertical relation of the seat and back to each other may be varied to accommodate persons of different size.

The object of the first part of this branch of the invention is to insure the ease and comfort of the patients, which end is attained by the combination of the seat and back, the vertical relation of which to each other may be varied with mechanism by which the seat may be rocked or oscillated relatively to the back to conform to the position of the occupant.

This part of the invention also consists in the combination of the seat and back with mechanism by which the seat may be rocked or oscillated relatively to the back and locked at any desired angle.

The object of the next part of this branch of the invention is to render a dental chair-seat adjustable independently relatively to the base and to the chair-body, both vertically and as to inclination, which ends are attained by pivoting the seat on a support movable vertically relatively to the base and chair-body.

The object of the next part of this branch of the invention is to enable the operator to adjust the chair-body and rocking seat vertically relatively to the base by distinct mechanisms, and to render them adjustable as to inclination by common elevating mechanism independently of the seat-rocking devices, which ends are attained by mounting the chair-body on a rocking and turning tubular support, which also carries the rocking seat and its elevating mechanism.

The object of the next part of this branch of the invention is to enable the operator to tilt the chair-body and seat relatively to the base and to each other, and to turn the chair and seat and their support (without raising them) and to lock them in such adjusted position, which ends are attained by combining a chair-seat rocking on a pivot, devices for locking the chair-body at varying angles, as required, and a tubular support turning relatively to the base without raising or lowering the chair.

The object of the next part of this branch of the invention is to provide a dental chair in which the vertical relation of the back, head-rest, and seat to each other may be varied to accommodate the difference in size of the various persons occupying the chair, and in which the seat and back are also capable of a variable inclination or angular change of position relatively to each other to insure the ease and comfort of the occupant.

This part of the invention further consists in the combination, in a dental chair, of a back and seat, the relation of which to each other vertically, as well as to inclination or angle, may be varied with a head-rest carried by the back adjustable vertically, horizontally, (or backward and forward,) and laterally relatively to the back, whereby every necessary adjustment is provided for insuring the ease and comfort of the patient and for the convenience of the operator.

The object of the next part of the invention is to provide a dental chair with a back and seat capable of a variable inclination or angular adjustment relatively to each other, and with a head-rest carried by the back capable of varying adjustments independently of the adjustment of the back, which ends are attained by combining a back and seat capable of varying inclination relatively to each other with a head-rest adjustable vertically, laterally, and horizontally (or backward and forward) relatively to the back, whereby the ease and comfort of the patient are insured.

This part of the invention also consists in the combination, in a dental chair, of a back and seat capable of varying inclination relatively to each other with a head-rest adjustable laterally independently of the back.

This part of the invention also consists in the combination of a back and seat capable of varying inclination relatively to each other with a head-rest adjustable horizontally (or backward and forward) relatively to the back.

This part of the invention also consists in the combination of the back and seat capable of a varying inclination relatively to each other with a head-rest adjustable vertically and laterally in reference to the back.

This part of the invention further consists in the combination of the back and seat capable of varying inclination relatively to each other with a head-rest adjustable vertically and horizontally (or backward and forward) relatively to the back.

The next branch of the invention relates to the head-rest of a dental chair; and its general object is to give it the widest practicable range of adjustment to accommodate the varying circumstances under which it is required to operate.

The special object of the first part of this branch of the invention is to enable the operator to reverse and raise or lower the head-rest or change its position without necessitating the turning of the support upon which it is mounted, and simply by swinging or turning it around or upon its vertical support, which ends are attained by combining a vertically-adjustable support or bar, upon which a clamp acts to secure it firmly in its adjusted position, a support carrying a head-rest pad, mounted upon the vertically-adjustable support, and capable of being turned around upon it to present the pad in a new relation to the chair-back without turning, moving, or disturbing the position of the vertical support, and a clamping device to lock the reversible head-rest in position.

The special object of the next part of this branch of the invention is to render the head-rest adjustable backward and forward or horizontally relatively to the chair-back, and reversible or capable of being turned so as to present the pad in a new relation to the chair-back, which ends are attained by mounting the head-rest upon a turning-support acted upon by a clamp, and adjustable backward and forward relatively to the back of the chair.

Figure 5:
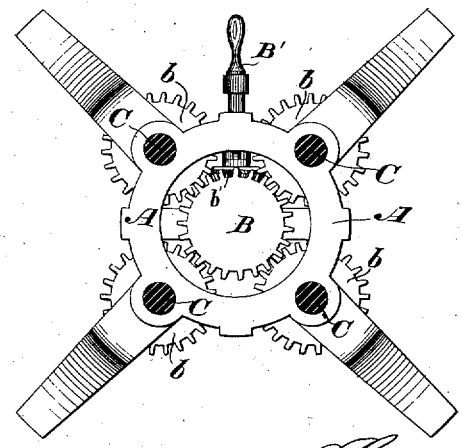

In the accompanying drawings, Figure 1 represents a front elevation of the improved chair, partly in section, on the line 1 1 of Fig. 3. Fig. 2 represents a rear elevation thereof; Fig. 3, a vertical longitudinal section through the chair-body and base on the line 3 3 of Figs. 1 and 2. Fig. 4 represents a sectional perspective view on an enlarged scale through the chair-seat, showing the devices for supporting and tilting it. Fig. 5 represents a horizontal section on the line 5 5 of Figs. 1, 2, and 3. Fig. 6 represents a side view of the head-rest, partly in vertical longitudinal central section, to show the details of its adjustment more clearly. Fig. 7 represents a vertical transverse section through the head-rest support on the line 7 7 of Figs. 3 and 6. Fig. 8 represents a transverse section through the head-rest support on the line 8 8 of Fig. 3.

To a suitable base or stand, A, is fixed a ring, A′, the space between them being sufficient to admit a series of nut-wheels, *b*, which work freely on a corresponding series of screws, C, the ring A′ thus forming bearings for the under side of the nut-wheels. In the center of the ring A′ is a bearing for a center wheel, B, to which wheel motion is imparted through the intervention of a hand-crank, B′, and bevel-wheels $b^1$ $b^2$, by which means all the nut-wheels *b* are caused to rotate at the same time and in the same direction.

The upper ends of the screws C are fixed to projections on the rings C′ at points coincident with holes in the base through which said screws pass. Within this ring C′ a chamber or bearing is made, into which leather or other adhesive and frictional material *c* is placed in such manner that a perforated ball or circular tubular chair-support, D, mounted in said chamber, fits closely at all points.

A clamping ring or band, D′, is fitted on the upper part of this ball D. A screw-rod, *d*, projects downwardly from this band through a projection on the supporting-ring C′, and is provided with a set-nut, by which means the band may be clamped more or less tightly upon the ball.

A downwardly-projecting rod, *d′*, on the opposite side of the clamping-band, is provided at its lower end with eyes or loops, in which an eccentric or cam, *e*, is pivoted, which cam is worked by a foot-lever, E, connected therewith. The ball D is shown as provided with a central tube or pipe, *g*, of suitable size to receive an elevating-screw or seat-support, G, upon which the chair-seat is mounted, as hereinafter more particularly described.

The body F of the chair is attached by framework *f* to a flange formed upon the top of the ball. The elevating-screw or seat-support G, above mentioned, passes through a bevel-nut wheel, H′, revolving upon the top of the ball D, and has a cross-bar, I, mounted upon its upper end. The ends *i* of this cross-bar are bent upward and slightly forward, extending midway into the seat J of the chair, and are pin-jointed thereto at *j*.

A rod, *k*, passes through the ears or turned-up ends *i*, near the cross-bar I, and has a cam, K, fixed upon either of its projecting ends, the said cams operating upon stud-pins *k′* fixed on the seat. (See Fig. 4.) The nut-wheel H′ is rotated by a pinion, $h$, operated by a crank, H, to raise or lower the seat without revolving it.

A round slide-bar, L, is fitted into and slides freely endwise in bearings $l$ $l'$ in a metallic piece or bracket, $L^1$, which is fastened to the back of the chair, in which metallic piece $L^1$ is fitted a clamp-screw, $L^2$, and also a guide-screw, $L^3$, the point of which guide-screw extends through the bracket $L^1$ into a longitudinal groove in the slide-bar L. (See Fig. 8.)

To the upper end of the slide-bar L is securely fixed an overhanging bracket-piece, M, through an opening in which a round slide-rod, N, moves freely endwise. A clamp-screw, $M^1$, locks this rod in any position desired. A guide-screw, $M^2$, the point of which reaches through the bracket M into a longitudinal groove, $n$, in the tubular-slide rod above mentioned, (see Figs. 3, 6, 7, and 8,) prevents this slide-rod from turning in its bearings until released from the guide-screw, while leaving it free to move endwise therein.

A head-rest is mounted upon a cushion-plate, R, provided with a dovetail slot or groove, $r$, Figs. 2, 3, and 6, in which slot a dovetail-headed bolt, $p$, carrying on its threaded end a clamping-nut and handle, fits. This clamp-screw passes through a plate, O, rocking upon pivots $o$ on a support, $o'$, fixed upon the end of the slide-rod N, the inclination of this plate being regulated by means of a sector-rack, $n^1$, meshing with a screw, N', passing through the tubular slide-rod N, and being provided with a milled head, $n^2$, by which it may readily be turned.

Projections on the inside of the plate O fit into the dovetailed slot $r$ in the cushion-plate on each side of the headed bolt $p$, and thus prevent the cushion-plate from turning on the plate O, while permitting it to be adjusted laterally thereon.

The head-rest is connected with its turning-supports at a point on one side of a horizontal line drawn transversely through its center in this instance, which arrangement permits of a reversal of the head-rest, to elevate or depress it, as hereinafter explained.

The invention being thus described, its operation will now be explained.

First, through the intervention of the crank B', its bevel-wheels $b^1$ $b^2$, and the center wheel B, the nut-wheels $b$ are revolved, thus easily raising or lowering the whole body of the chair to any desired height.

Secondly, raising the foot-lever E loosens the clamping-band D' upon the ball D, and enables the operator to place the body of the chair at any required angle of inclination, or to turn it horizontally by moving the ball in its bearings in the ring C', and lowering the foot-lever clamps it securely in any such position.

Thirdly, the chair-seat J may be raised to any required height by turning the crank H, which, through its pinion, revolves the bevel-nut wheel H', through which the screw G passes.

Fourthly, the seat may be rocked upon its support by means of the cam-levers K—for instance, raising the lever tilts the front of the seat up, and consequently lowers its back and retains it at such angle as is needed more effectually to prevent the patient from slipping and sliding forward during painful dental operations.

It will thus be seen that while the chair-base and elevating mechanism remain fixed, the chair-body and seat may, through the medium of the ball interposed between said base and the chair-body, be readily turned horizontally and tilted relatively to the base and locked in any desired position, and that the chair-seat may readily be raised, lowered, or oscillated upon its supports independently of the chair-body, by which the size of the patient may be accommodated and ease and comfort secured.

Of the head-rest it may be remarked—

First, that it may be raised or lowered to any desired height by moving its support endwise through its bearings, and fixed by means of the clamp-screw $L^2$, and, by disengaging its guide-screw $L^3$ from its groove, the operator is enabled to rock the slide-bar horizontally in its bearings to arrange the cushion-plate or head-rest in different planes relatively to the back of the chair, and to secure it in such adjusted position by means of the clamp-screw $L^2$, as before.

Secondly, the head-rest or cushion-plate may be adjusted backward or forward by means of the slide-rod N, and fixed where required by its clamping-screw $M^1$. It may also be turned to either side of the chair by disengaging its guide-screw $M^2$ from its groove and rocking the slide-rod in its bearings, and may be as securely clamped in such adjusted position by its clamping-screw, as before.

Thirdly, the head-rest or cushion-plate may readily be adjusted and held at any desired inclination relatively to the back of the chair by means of the slide-rod N, its milled head and screw N', and the sector-rack $n^1$ on the rocking plate O.

Fourthly, the head-rest or cushion-plate may move horizontally and laterally to either side of the chair, and may be firmly secured to its supporting-plate O by means of its dovetail-headed bolt and clamp-nut.

It will thus be seen by these improvements that the head-rest is rendered adjustable vertically, as well as capable of turning axially upon its vertical support; that it is adjustable backward or forward, horizontally as well as axially, relatively to said horizontal support; that its angle of inclination may be varied, and that it may be adjusted laterally, whereby a wide range of adjustment is imparted to the head-rest to adapt it to the varying circumstances or conditions under which it is required to operate.

By swinging or turning the head-rest entirely around or upon its horizontal support it will be obvious that the head-rest will be brought below the vertical plane of its said horizontal support, as well as reversed in position, thus adding another to the various capabilities of adjustment of the improved head-rest, without necessitating the disturbance of or moving its vertical support or rod.

What is claimed as the invention of JAMES O. WHITCOMB is—

1. The combination, substantially as hereinbefore set forth, of the base, a series of elevating-screws mounted therein, a series of nut-wheels controlling the movements of the elevating-screws, and the chair-body, rocking upon its support, carried by the screws.

2. The combination, substantially as hereinbefore set forth, of the seat and back, the vertical relation of which to each other may be varied, with mechanism by which the seat may be rocked or oscillated relatively to the back, to conform to the position of the occupant.

3. The combination, substantially as hereinbefore set forth, of the seat and back, with mechanism by which the seat may be rocked or oscillated relatively to the back and locked at any desired angle.

4. The combination, substantially as hereinbefore set forth, of the seat-support, movable vertically relatively to the base and to the chair-body, with the seat pivoted thereon, whereby the seat is rendered adjustable independently relatively to the base and chair-body, both vertically and as to inclination.

5. The combination, substantially as hereinbefore set forth, of the chair-body mounted on a tubular support capable of rocking and turning relatively to its base, and the vertically-adjustable rocking seat also mounted on said support.

6. The combination, substantially as hereinbefore set forth, of the seat rocking on its pivots relatively to the chair-back, locking devices for securing the chair-body at varying angles, as required, and the tubular support upon which the chair is mounted, turning relatively to the base without raising or lowering the chair.

7. The combination, substantially as hereinbefore set forth, of the back, the head-rest, and the seat, the relation of which to each other vertically may be varied to accommodate the differences in size of various persons occupying the chair, with mechanism by which the inclination or angle of the seat and back may be varied relatively to each other, to insure the ease and comfort of the occupant.

8. The combination, substantially as hereinbefore set forth, of the back and seat, the relation of which to each other vertically as well as to inclination or angle may be varied, with a head-rest carried by the back, adjustable vertically, horizontally, (or backward and forward,) and laterally relatively to the back, whereby all necessary adjustments are provided for insuring the ease and comfort of the patient and for the convenience of the operator.

9. The combination, substantially as hereinbefore set forth, of the back and seat, capable of varying inclination relatively to each other, with a head-rest adjustable vertically, laterally, and horizontally backward and forward relatively to the back, whereby the ease and comfort of the patient are insured.

10. The combination, substantially as hereinbefore set forth, of the back and seat, capable of varying inclination relatively to each other, with the head-rest adjustable laterally independently of the back.

11. The combination, substantially as hereinbefore set forth, of the back and seat, capable of varying inclination relatively to each other, with the head-rest adjustable horizontally or backward and forward.

12. The combination, substantially as hereinbefore set forth, of the back and seat, capable of varying inclination relatively to each other, with the head-rest adjustable vertically and laterally in reference to the back.

13. The combination, substantially as hereinbefore set forth, of the back and seat, capable of varying inclination relatively to each other, with the head-rest adjustable vertically and horizontally, or backward and forward, relatively to the back.

14. The combination of the vertically-adjustable supporting-bar, its clamp, the head-rest pad-support N, mounted and turning upon the supporting-bar, and the clamp acting upon the turning support, these members being constructed to operate in combination, substantially as hereinbefore set forth, whereby the head-rest support is capable of being turned around upon the vertical supporting-bar to reverse the pad without turning or disturbing the position of the vertical support.

15. The head-rest mounted upon a turning support, acted upon by a clamp, and adjustable backward and forward relatively to the back of the chair, substantially as described, whereby the head-rest is rendered adjustable backward and forward, and is also capable of being turned so as to present the pad in a new relation to the chair-back.

SAMUEL STOCKTON WHITE.

Witnesses:

J. A. B. WILLIAMS,
FRANK L. HISE.